United States Patent [19]

Salman

[11] 4,248,931

[45] Feb. 3, 1981

[54] DIMENSIONALLY STABLE STRUCTURAL FOAM PLASTIC PRODUCT

[75] Inventor: Syed Salman, Sterling Heights, Mich.

[73] Assignee: International Telephone & Telegraph Corporation, New York, N.Y.

[21] Appl. No.: 143,748

[22] Filed: Apr. 25, 1980

[51] Int. Cl.³ .............................................. B32B 5/18
[52] U.S. Cl. .................................. 428/315; 264/45.5; 428/308; 428/324; 521/51
[58] Field of Search ......................... 521/51, 903, 907; 428/315, 310, 324, 454, 304, 306, 308; 264/45.5

[56] References Cited

U.S. PATENT DOCUMENTS

| | | | |
|---|---|---|---|
| 3,994,845 | 11/1976 | Blackford | 428/306 |
| 4,072,788 | 2/1978 | Herweg et al. | 428/315 |
| 4,101,050 | 7/1978 | Buckler et al. | 428/304 |
| 4,154,785 | 5/1979 | Inui et al. | 521/51 |
| 4,163,824 | 8/1979 | Saidla | 428/315 |
| 4,169,915 | 10/1979 | Heitmann | 428/310 |

*Primary Examiner*—William J. Van Balen
*Attorney, Agent, or Firm*—James B. Raden; Harold J. Holt

[57] ABSTRACT

A thermally and dimensionally stable structural foam plastic product having a cellular core and an integral solid skin on the surface thereof. The structural foam product is produced by injection molding and comprises a thermoplastic resin and from 1 to 30% by volume of flake mica as a filler.

9 Claims, 1 Drawing Figure

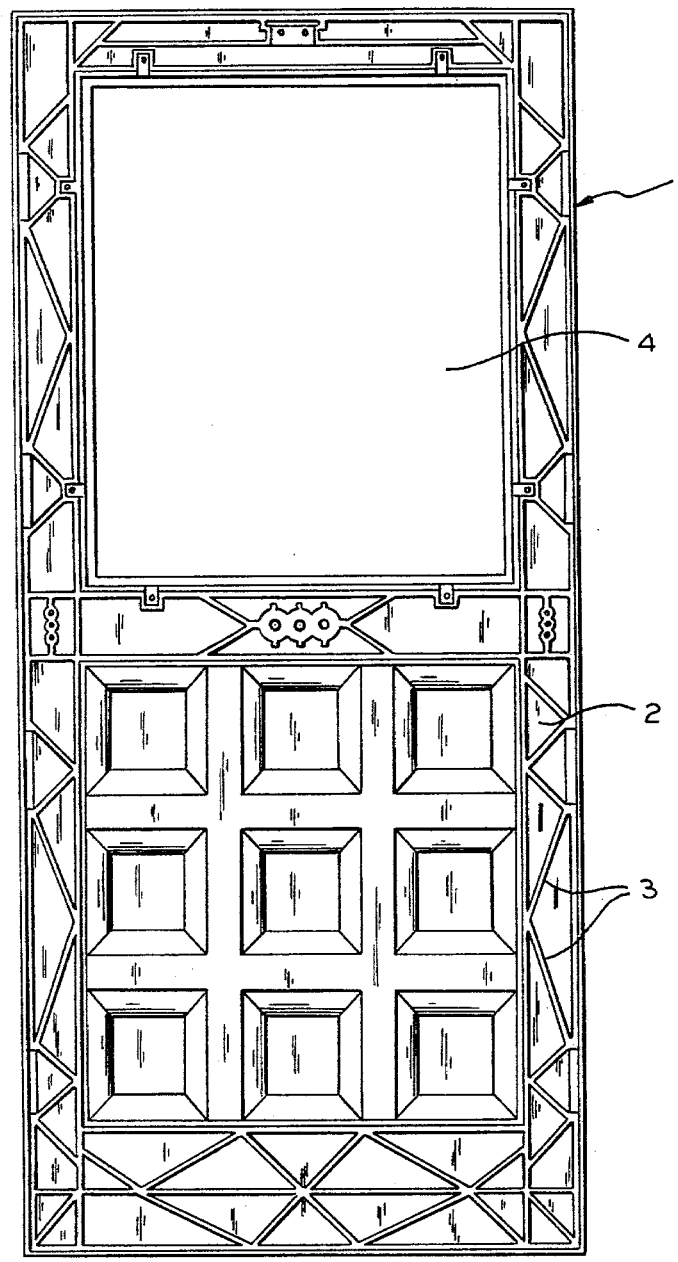

DIMENSIONALLY STABLE STRUCTURAL FOAM PLASTIC PRODUCT

This invention relates to a dimensionally stable structural foam plastic product and to a process for its production and particularly to a structural foam plastic storm door.

Plastic storm doors have recently been introduced having a number of significant advantages over comparable storm doors of conventional materials of construction such as wood or aluminum. Plastic storm doors have the potential of providing superior thermal insulation properties and greater design flexibility. However, in terms of conventional plastic molding practices, a storm door is a relatively large component and such plastic doors accordingly present sagging and warpage problems. A plastic storm door having excellent strength characteristics which overcome much of this problem is shown in U.S. Pat. No. 4,155,200 to P. R. Emanuel assigned to the present assignee. The door there shown consists essentially of a single injection molded plastic panel of cross-ribbed design having a cellular core and an integral solid skin. However, under severe handling or environmental conditions, the foregoing door still exhibits some susceptibility to warpage.

It is a principal object of the present invention to provide a structural foam plastic product having a greater degree of thermal and dimensional stability than has heretofore been possible.

It is a more specific object of this invention to provide a plastic storm door combining excellent dimensional and thermal stability with excellent strength and high thermal insulation characteristics.

The foregoing and other objects are achieved in a structural foam plastic product having a cellular core and an integral solid skin on the surface thereof, said product comprising a thermoplastic resin and from 1 to 30% of mica, by volume, said percentage based upon the volume of resin. The product is produced by mixing together the thermoplastic resin and mica and injection molding the mixture together with a blowing agent at a temperature and pressure at which said mixture foams.

The invention will be better understood by reference to the accompanying drawing in which the single FIGURE shows a unitary plastic panel for a storm door.

The injection molding process used to prepare the structural foam product of the invention is more fully described in U.S. Pat. Nos. 3,268,636 and 3,436,446. As there shown, a foamable thermoplastic polymeric material, such as polystyrene or polypropylene, is mixed with a blowing agent, which may be a chemical blowing agent, such as azodicarbonamide, or a physical blowing agent, such as nitrogen. The thermoplastic material and blowing agent are then heated in an extruder to a temperature at least equal to the melting temperature of the thermoplastic and above the foaming temperature of the blowing agent, if the blowing agent is of a chemical type, while it is maintained at a pressure above the foaming pressure. The resulting molten mixture is extruded into an expanding accumulation zone while maintained in the molten state under pressure and then rapidly forced into a mold at a pressure less than the pressure at which the mixture foams. The mold is not completely filled during injection. The mixture then foams, expands and fills out the mold to produce a solid skin and an integral low density core.

In the present invention, from 1 to 30% of finely divided mica, preferably from 10 to 20%, by volume based on the volume of thermoplastic resin, is dry blended with the thermoplastic resin. Dry blending is carried out by mixing the resin, unmelted and in the form, for example, of beads, with mica mechanically, as for example, by tumble blending. The preferred form of mica is flake mica having a high aspect (length/diameter) ratio between 50 and 10,000 with diameters between 2 and 400 microns and a U.S. Standard mesh size varying from 20 to 400, even more preferably from −60 to +150. The mica may also be surface treated with organo functional silane coupling agents for improving adhesion and resin wet-out of the mica with the plastics. The preferred thermoplastic polymer for use in storm door panels is polystyrene, preferably a mixture of approximately equal amounts of high impact and general purpose polystyrene.

The following example illustrates the preparation of a storm door in accordance with the invention. Unless otherwise indicated, all parts and percentages are by weight.

EXAMPLE

A special purpose, multinozzle, low injection pressure molding machine of the type shown in the aforementioned U.S. Pat. Nos. 3,268,636 and 3,436,446 was used to produce the plastic storm door panel shown in the drawing. A large specially designed 30:1 length to diameter ratio extruder screw was used to plasticate the thermoplastic resin and the blowing agent and pump the gas and melt under pressure to a melt accumulator. The melt accumulator was used to store the measured polymer melt during the cooling cycle (under pressure so that the foaming gas cannot expand). Because of the short shot, cavity pressure remains low although cavity fill rates are very fast.

The polymer used was an injection molding grade of polystyrene, more specifically a 50/50 mixture of high impact polystyrene (modified with 8–10% of butadiene) sold under the trademark Polysar 520 and general purpose polystyrene (Polysar 205). To the mixture of resin in the form of beads was added 20% by volume of suzorite mica of −100 +150 mesh. The mica was blended with the resin manually. The polystyrene/mica mixture was further mixed with the blowing agent, more specifically nitrogen, in the barrel of the extruder and shot into the mold as described earlier. The typical usage level of nitrogen in this application is between 0.5–3 percent of resin. The stock temperature was 498° F. and injection pressure 5000 PSI.

The storm door panel prepared in accordance with the foregoing example is generally identified in the drawing by numeral 1. It consists of a continuous channel 2 around the peripheral surface of the panel, the channel being crossed by a series of integral load-transferring diagonal ribs 3. The door has a large opening 4 adapted to hold a window or screen.

A series of doors produced in accordance with the foregoing example were tested for thermal and dimensional stability in a heat box and the results compared with the results of identical doors differing only in the omission of the mica. The tests were carried out by mounting the sample door on an insulated box with all the fittings. The box was heated to a temperature of 150° F. or 180° F. When the temperature stabilized for 30 minutes, the extent of the warpage of the doors was determined by measuring the amount of bow on the door. This test simulates the actual conditions a door would experience when mounted in the field. The results were as follows:

|  | Temperature | Total Warpage (Inches) |
|---|---|---|
| Standard Door | 150° F. | 22/64 to 28/64 |
| Door of Ex. 1 | 150° F. | None |
| Standard Door | 180° F. | 42/64 |
| Door of Ex. 1 | 180° F. | 17/64 to 32/64 |

The surface temperature of doors tested at 150° F. box temperature was 100°-105° F. and that of doors tested at 180° F. was 115°-120° F. While some difference in dimensional stability among the samples results from differences in the precise molding, handling and storage conditions, the doors of the invention consistently exhibited greater dimensional stability than standard doors containing no mica.

I claim:

1. A thermally and dimensionally stable structural foam plastic product having a cellular core and an integral solid skin on the surface thereof comprising a thermoplastic resin and from 1 to 30% of finely divided mica by volume, said percentage based upon the volume of resin.

2. A storm door comprising a unitary plastic panel of the structural foam product of claim 1.

3. The structural foam product of claim 1 in which the thermoplastic resin is selected from the group consisting of polystyrene and polypropylene.

4. The structural foam product of claim 1 in which the thermoplastic resin is polystyrene.

5. The structural foam product of claim 4 in which the thermoplastic resin consists of substantially equal parts of high impact and general purpose polystyrene.

6. The structural foam product of claim 1 in which the mica is flake mica having a mesh size ranging from 20 to 400.

7. A process for preparing a thermally and dimensionally stable structural foam plastic product comprising mixing together a thermoplastic resin and from 1 to 30% of finely divided mica by volume, said percentage based upon the volume of resin and injection molding said mixture together with a blowing agent at a temperature and pressure at which said mixture foams to form a plastic product having a cellular core and an integral solid skin on the surface thereof.

8. The process of claim 1 in which the resin and mica are dry blended.

9. The process of claim 1 in which the resin is polystyrene.

* * * * *